(12) United States Patent
Lee et al.

(10) Patent No.: US 7,975,069 B2
(45) Date of Patent: Jul. 5, 2011

(54) ROUTING METHOD IN CONSIDERATION OF POWER AND TRANSMISSION DELAY IN WIRELESS AD HOC NETWORK AND TERMINAL DEVICE ADOPTING THE SAME

(75) Inventors: Sung-hwan Lee, Suwon-si (KR); Cheolgi Kim, Daejeon (KR); Joongsoo Ma, Daejeon (KR); Ki-soo Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 984 days.

(21) Appl. No.: 11/637,680

(22) Filed: Dec. 13, 2006

(65) Prior Publication Data
US 2008/0010385 A1    Jan. 10, 2008

Related U.S. Application Data

(60) Provisional application No. 60/786,383, filed on Mar. 28, 2006.

(30) Foreign Application Priority Data

Jul. 28, 2006    (KR) .................. 10-2006-0071767

(51) Int. Cl.
*G06F 15/173* (2006.01)
*G06F 11/00* (2006.01)
*G01R 31/08* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 709/241; 709/239; 370/238
(58) Field of Classification Search .................. None
See application file for complete search history.

(56) References Cited

U.S. PATENT DOCUMENTS

| | | | | |
|---|---|---|---|---|
| 7,406,078 | B2 * | 7/2008 | Jeon | 370/392 |
| 7,408,911 | B2 * | 8/2008 | Joshi | 370/338 |
| 7,414,977 | B2 * | 8/2008 | Orlik et al. | 370/238 |
| 7,522,537 | B2 * | 4/2009 | Joshi | 370/254 |
| 2003/0161268 | A1 * | 8/2003 | Larsson et al. | 370/229 |
| 2003/0189906 | A1 * | 10/2003 | Belcea | 370/318 |
| 2005/0014510 | A1 * | 1/2005 | Jeon | 455/452.2 |
| 2005/0030921 | A1 * | 2/2005 | Yau | 370/329 |
| 2005/0036486 | A1 * | 2/2005 | Sahinoglu et al. | 370/389 |

(Continued)

FOREIGN PATENT DOCUMENTS
KR    10-2005-0008465 A    1/2005

*Primary Examiner* — David E England
(74) *Attorney, Agent, or Firm* — Sughrue Mion, PLLC

(57) ABSTRACT

A routing method in consideration of the power and transmission delay in a wireless ad hoc network and a terminal device adopting the same are provided, which can reduce the power consumption and packet delay by considering both the power consumption and packet delay. The terminal device includes a judgment unit that determines whether a first accumulative hop count included in a first route request (RREQ) packet exceeds a predetermined route decision value for limiting a hop count from a source node to a destination node, and a control unit that determines a route to the source node, based on information included in the first RREQ packet, if the judgment unit determines that the first accumulative hop count does not exceed the route decision value.

26 Claims, 4 Drawing Sheets

U.S. PATENT DOCUMENTS

| | | | |
|---|---|---|---|
| 2005/0111428 A1* | 5/2005 | Orlik et al. | 370/344 |
| 2006/0007882 A1* | 1/2006 | Zeng et al. | 370/328 |
| 2006/0293061 A1* | 12/2006 | Kobayashi et al. | 455/455 |
| 2007/0045424 A1* | 3/2007 | Wang | 235/462.46 |
| 2007/0266143 A1* | 11/2007 | Zeng et al. | 709/224 |
| 2008/0010385 A1* | 1/2008 | Lee et al. | 709/241 |
| 2008/0075028 A1* | 3/2008 | Park et al. | 370/311 |
| 2009/0129376 A1* | 5/2009 | Johnson | 370/357 |

* cited by examiner

TERMINAL TRANSISSION RANGE

ROUTING METHOD IN CONSIDERATION OF POWER AND TRANSMISSION DELAY IN WIRELESS AD HOC NETWORK AND TERMINAL DEVICE ADOPTING THE SAME

CROSS-REFERENCE TO RELATED APPLICATIONS

This application claims priority from U.S. Provisional Patent Application No. 60/786,383, filed on Mar. 28, 2006 in the United States Patent and Trademark Office, and from Korean Patent Application No. 2006-71767, filed on Jul. 28, 2006 in the Korean Intellectual Property Office, the disclosures of which are incorporated herein in their entireties by reference.

BACKGROUND OF THE INVENTION

1. Field of the Invention

Apparatuses and methods consistent with the present invention relate to a routing method in consideration of the power and transmission delay in a wireless ad hoc network and a terminal device adopting the same, and more particularly, to a routing method and a terminal device which can reduce both the power consumption and packet delay by limiting a hop count from a source node to a destination node.

2. Description of the Related Art

A wireless ad hoc network is a temporary network that can be autonomously constructed by a plurality of nodes having mobility. In the wireless ad hoc network serving as a communication network, a plurality of terminal devices, which independently exist in space, perform one-to-one, one-to-many, and many-to-many communications with all appliances existing within radii recognizable to the terminal devices themselves. Recently, the wireless ad hoc network technology has been applied to diverse application fields, such as home networking, sensor networks, and personal area networks, and active research into the wireless ad hoc network has been conducted.

Respective nodes that constitute a wireless ad hoc network have limited transmission ranges. Thus, if a destination, with which a node intends to communicate, is out of the transmission range of the node, then other nodes existing in the transmission range of the node perform packet relay functions to make it possible to perform the data communications with the destination.

FIG. 1 is a view provided to explain a conventional routing method in a wireless ad hoc network.

Referring to FIG. 1, a source node A uses nodes B, C, and D in order to communicate with a destination node E. In this case, the source node A broadcasts a route request (RREQ) that includes information on transmission power in order to set a route between the source node A and the destination node E. The node C receives the RREQ from the source node A, and calculates an accumulative power, which is obtained by accumulating the transmission power required to broadcast the RREQ and the transmission power included in the RREQ received from the source node A.

Then, the node C carries the accumulative power and the transmission power information required to broadcast the RREQ on the RREQ to be broadcast. In this manner, if the RREQ is received in the destination node E, the node E selects the RREQ having the minimum accumulative power included in the received RREQ, and transmits a route reply (RREP) to the node that has transmitted the selected RREQ to set the route.

However, since the conventional routing method in consideration of power in an ad hoc network sets the nodes having the minimum accumulative power as relay nodes, the route length from the source node to the destination node is lengthened as the number of relay nodes is increased. Due to this increase of the route length, packet delay occurs, and this causes the quality of service (QoS) to deteriorate. Accordingly, a routing method in a wireless ad hoc network that supports a proper tradeoff between the power being consumed and the packet delay during the packet transmission is needed.

SUMMARY OF THE INVENTION

The present invention has been developed in order to address the above drawbacks and other problems associated with the conventional arrangement. An aspect of the present invention provides a routing method in consideration of the power and transmission delay in a wireless ad hoc network and a terminal device adopting the same, which can reduce the power consumption and packet delay by considering both the power consumption and packet delay.

The foregoing and other aspects are substantially realized by providing a terminal device, according to the present invention, which includes a judgment unit that determines whether a first accumulative hop count included in a first route request (RREQ) packet exceeds a predetermined route decision value for limiting a hop count from a source node to a destination node; and a control unit that determines a route to the source node based on information included in the first RREQ packet if the judgment unit determines that the first accumulative hop count does not exceed the route decision value.

The first RREQ packet may include transmission power information including at least one of a transmission power required to transmit the RREQ packet, the first accumulative hop count, and a first accumulative power.

The predetermined route decision value may be based on a transmission power required to transmit the first RREQ packet and a route length from the source node to the destination node.

The predetermined route decision value may be an optimal hop count that reduces the transmission power required to transmit the first RREQ packet and reduces a packet delay.

The control unit may determine the route to the source node by controlling a route reply (RREP) packet to be transmitted to a node which has transmitted the first RREQ packet that includes the first accumulative hop count if the judgment unit determines that the first accumulative hop count does not exceed the predetermined route decision value.

The control unit may discard the first RREQ packet if the judgment unit determines that the first accumulative hop count exceeds the predetermined route decision value.

The judgment unit may compare a second accumulative hop count included in a second RREQ packet that is received after the route is determined with the predetermined route decision value, and compare a second accumulative power included in the second RREQ packet with the first accumulative power included in the first RREQ packet, which is used to determine the route. The control unit may update the route based on a result of comparing the second accumulative hop count with the predetermined route value and the second accumulative power with the first accumulative power The judgment unit may determine whether the second accumulative hop count exceeds the predetermined route decision value, and the judgment unit determines whether the second accumulative power is less than the first accumulative power if the judgment unit determines that the second accumulative hop count does not exceed the predetermined route decision value.

The control unit may update the route by controlling a route reply (RREP) packet to be transmitted to a node which has transmitted the second RREQ packet that includes the second accumulative power if the judgment unit determines that the second accumulative power is less than the first accumulative power.

The judgment unit may determine whether the second accumulative hop count is less than the first accumulative hop count if the judgment unit determines that the second accumulative power is equal to the first accumulative power, and update the route based on a result of comparing the second accumulative hop count with the predetermined route value and the second accumulative power with the first accumulative power. The control unit may update the route by controlling the RREP packet to be transmitted to the node which has transmitted the second RREQ packet if the judgment unit determines that the second accumulative power is equal to the first accumulative power and the second accumulative hop count is less than the first accumulative hop count.

The control unit may discard the second RREQ packet if the judgment unit determines that the second accumulative hop count exceeds the predetermined route decision value, the second accumulative power exceeds the first accumulative power, or the second accumulative power is equal to the first accumulative power and the second accumulative hop count is not less than the first accumulative hop count.

The terminal device according to the present invention may further include a transmitting and receiving unit that transmits and receives the first RREQ packet, transmits a route reply (RREP) packet, which is a reply packet to the first RREQ packet, and measures a transmission power required to broadcast the first RREQ packet; and a calculation unit that recalculates the first accumulative hop count by increasing the first accumulative hop count that is included in the first RREQ packet received through the transmitting and receiving unit by one, and recalculates the first accumulative power by adding the transmission power, which is measured by the transmitting and receiving unit, to the first accumulative power included in the first RREQ packet. The control unit may add transmission power information, which includes the first accumulative power calculated by the calculation unit, the first accumulative hop count, and the transmission power measured by the transmitting and receiving unit, to the first RREQ packet, and controls the transmitting and receiving unit to broadcast the first RREQ packet that includes the transmission power information added thereto.

The judgment unit may determine whether the terminal device is the destination node for the first RREQ packet; the transmitting unit may measure a transmission power required to broadcast the first RREQ packet if the judgment unit determines that the terminal device is not the destination node; and the calculation unit may recalculate the first accumulative power and the first accumulative hop count if the judgment unit determines that the terminal device is not the destination node.

The terminal device may further include a transmitting and receiving unit that transmits and receives a plurality of RREQ packets during a predetermined waiting time and transmits route reply (RREP) packets in response to the plurality of RREQ packets.

The judgment unit may compare accumulative hops included in each of the plurality of RREQ packets with the predetermined route decision value, and select an RREQ packet among the plurality of RREQ packets to be used for routing based on a result of comparing the accumulative hops included in the each of the plurality of RREQ packets with the predetermined route decision value, and the control unit may determine the route by controlling the RREP packet to be transmitted to a node that has transmitted the RREQ packet that is selected.

The judgment unit may select RREQ packets having accumulative hop counts that are less than the route decision value among the plurality of RREQ packets, and select an RREQ packet that has a minimum accumulative power among the RREQ packets that are selected as the RREQ packet to be used for the routing.

In another aspect of the present invention, there is provided a routing method, which includes determining whether a first accumulative hop count included in a first route request (RREQ) packet exceeds a predetermined route decision value for limiting a hop count from a source node to a destination node; and determining a route to the source node based on information included in the first RREQ packet if the first accumulative hop count is determined not to exceed the route decision value.

The first RREQ packet may include transmission power information including at least one of a transmission power required to transmit the RREQ packet, the first accumulative hop count, and a first accumulative power.

The predetermined route decision value may be based on a transmission power required to transmit the first RREQ packet and a route length from the source node to the destination node.

The predetermined route decision value maybe an optimal hop count that reduces the transmission power required to transmit the first RREQ packet and reduce a packet delay.

The determining the route to the source node may comprise determining the route by controlling a route reply (RREP) packet to be transmitted to a node which has transmitted the first RREQ packet that includes the first accumulative hop count if the first accumulative hop count is determined not to exceed the predetermined route decision value.

The first RREQ packet that is received may be discarded if the first accumulative hop count is determined to exceed the predetermined route decision value.

The determining whether the first accumulative hop count exceeds the predetermined route decision value may comprise comparing a second accumulative hop count included in a second RREQ packet that is received after the route is determined with the predetermined route decision value, and comparing a second accumulative power included in the second RREQ packet with the first accumulative power included in the first RREQ packet, which is used to determine the route. The route may be updated based on a result of comparing the second accumulative hop count with the predetermined route value and the second accumulative power with the first accumulative power.

The determining whether the first accumulative hop count exceeds the predetermined route decision value may further comprise determining whether the second accumulative hop count exceeds the predetermined route decision value, and determining whether the second accumulative power is less than the first accumulative power if the judgment unit determines that the second accumulative hop count does not exceed the predetermined route decision value.

The route is updated by controlling a route reply (RREP) packet to be transmitted to a node which has transmitted the second RREQ packet that includes the second accumulative power if the second accumulative power is determined to be less than the first accumulative power.

The second accumulative hop count may be determined to be less than the first accumulative hop count if the second accumulative power is determined to be equal to the first accumulative power, and the route may be updated by controlling the RREP packet to be transmitted to the node which has transmitted the second RREQ packet if the second accumulative power is determined to be equal to the first accumulative power and the second accumulative hop count is less than the first accumulative hop count.

The second RREQ packet may be discarded if the second accumulative hop count is determined to exceed the predetermined route decision value, the second accumulative power is determined to exceed the first accumulative power, or the second accumulative power is determined to be equal to the first accumulative power and the second accumulative hop count is not less than the first accumulative hop count.

The routing method according to the present invention may further include transmitting and receiving the first RREQ packet, transmitting a route reply (RREP) packet, which is a reply packet to the first RREQ packet, and measuring a transmission power required to broadcast the first RREQ packet; and recalculating the first accumulative hop count by increasing the first accumulative hop count that is included in the first RREQ packet by one, and recalculating the first accumulative power by adding the transmission power that is measured to the first accumulative power included in the first RREQ packet.

Further, transmission power information may be added, including the first accumulative power that is calculated, the first accumulative hop count, and the transmission power that is measured, to the first RREQ packet, and the first RREQ packet is broadcast having the transmission power information added thereto.

The determining whether the first accumulative hop count exceeds the predetermined route decision value may further comprise determining whether the terminal device is the destination node for the first RREQ packet, a transmission power required to broadcast the first RREQ packet may be measured if the terminal device is determined not to be the destination node, and the first accumulative power and the first accumulative hop count recalculated if the terminal device is determined not to be the destination node.

The routing method may further include transmitting and receiving a plurality of RREQ packets during a predetermined waiting time and transmitting route reply (RREP) packets in response to the plurality of RREQ packets.

The accumulative hops included in each of the plurality of RREQ packets may be compared with the predetermined route decision value, and an RREQ packet among the plurality of RREQ packets is selected to be used for routing based on a result of comparing the accumulative hops included in each of the plurality of RREQ packets with the predetermined route decision value wherein accumulative hops included in each of the plurality of RREQ packets are compared with the predetermined route decision value, and an RREQ packet among the plurality of RREQ packets may be selected to be used for routing based on a result of comparing the accumulative hops included in each of the plurality of RREQ packets with the predetermined route decision value.

Further, RREQ packets having accumulative hop counts that are less than the route decision value may be selected among the plurality of RREQ packets, and an RREQ packet that has a minimum accumulative power among the RREQ packets may be selected as the RREQ packet to be used for the routing.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS OF THE INVENTION

Figure 1:
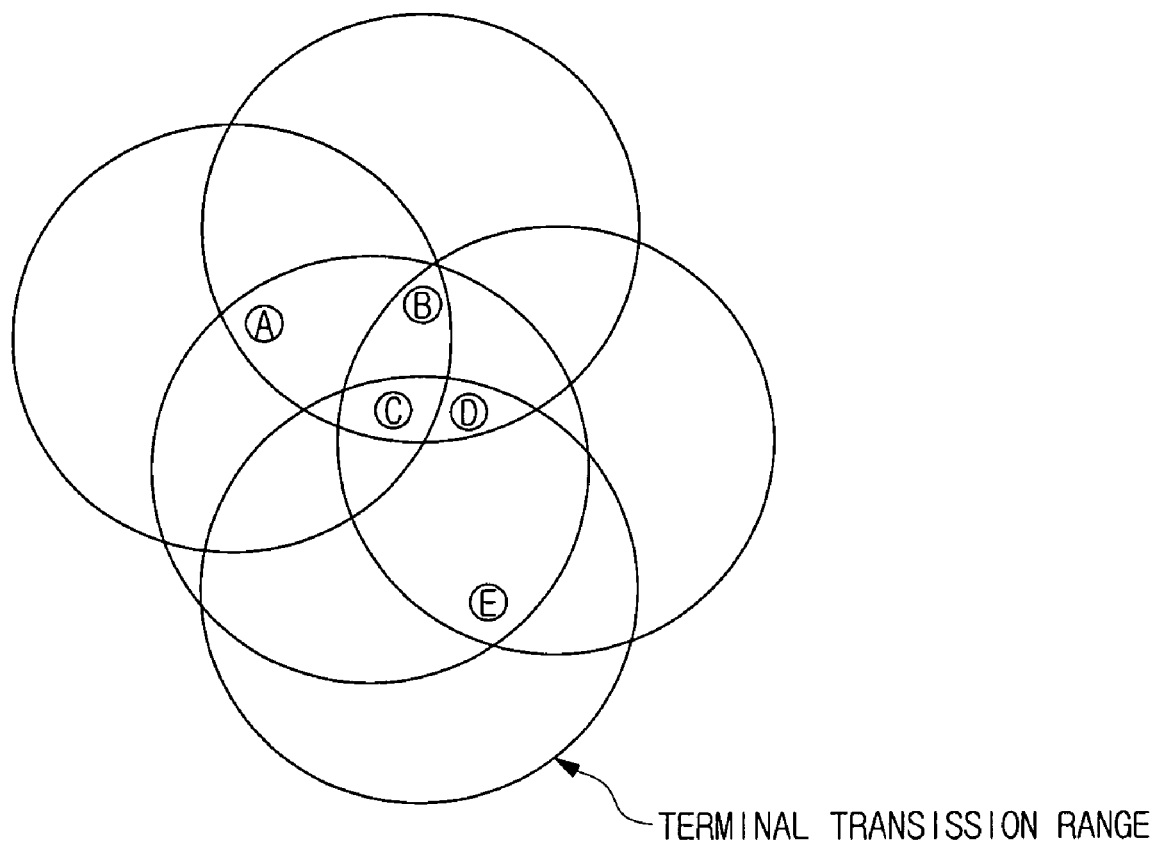
FIG. 1 is a view provided to explain a conventional routing method in a wireless ad hoc network.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
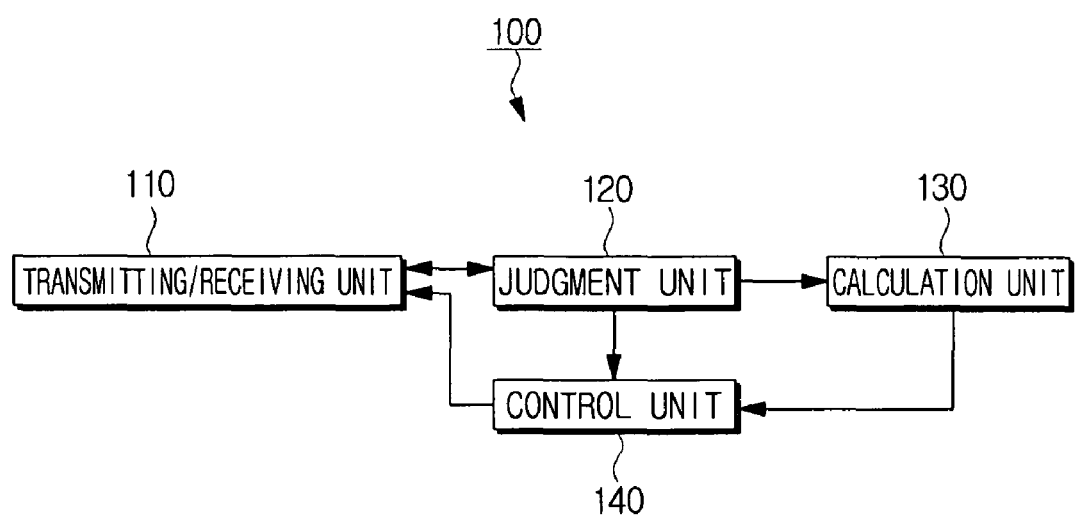
FIG. 2 is a block diagram illustrating the construction of a terminal device according to an exemplary embodiment of the present invention.

FIG. 2 is a block diagram illustrating the construction of a terminal device according to an exemplary embodiment of the present invention.

Referring to FIG. 2, the terminal device 100 includes a transmitting/receiving unit 110, a judgment unit 120, a calculation unit 130, and a control unit 140.

The transmitting/receiving unit 110 receives a route request packet (hereinafter referred to as an "RREQ"), and transmits a route reply packet (hereinafter referred to as an "RREP"), which is a response packet to the RREQ. If the judgment unit 120 determines that the terminal device 100 is not a destination node, the transmitting/receiving unit 110 measures a transmission power required to broadcast an RREQ obtained by adding specified information to the received RREQ, and broadcasts the RREQ that includes the measured transmission power.

Here, the transmission power information may include the measured transmission power, an accumulative hop count, and an accumulative power. The accumulative hop count and the accumulative power will be explained later through the operation of the calculation unit 130.

The judgment unit 120 determines whether the terminal device 100 that has received the first RREQ is a destination node, based on the destination address included in the first RREQ received through the transmitting/receiving unit 110. If the terminal device 100 is determined to be the destination node, the judgment unit 120 determines whether the first accumulative hop count included in the received first RREQ does not exceed a predetermined route decision value.

Here, the route decision value is a value that corresponds to the limited hop count from a source node to the destination node, and is predetermined in consideration of the transmission power and the route length from the source node to the destination node.

If the terminal device 100 is determined to be the destination node of the second RREQ that is received after the route to the source node is set by the control unit to be explained later, the judgment unit 120 compares the second accumulative hop count included in the second RREQ with the predetermined route decision value, and compares the second accumulative power with the first accumulative power used for routing.

Specifically, the judgment unit 120 determines whether the second accumulative hop count does not exceed the route decision value, and if the second accumulative hop count does not exceed the route decision value, the judgment unit 120 determines whether the second accumulative power is below the first accumulative power. At this time, if the second accumulative power is determined not to be below the first accumulative power, the judgment unit 120 determines whether the second accumulative power is equal to the first accumulative power. If the second accumulative power is determined to be equal to the first accumulative power, the judgment unit 120 determines whether the second accumulative hop count is below the first accumulative hop count. Then, the judgment unit 120 transmits the result of determination to the control unit 140 to be explained later.

If the judgment unit 120 determines that the terminal device 100 is not the destination node for the received first RREQ (i.e., that the terminal device 100 is a relay node), the calculation unit 130 recalculates the first accumulative power by adding the transmission power measured by the transmitting/receiving unit to the first accumulative power that is added to the transmission power information included in the first RREQ.

In addition, if the judgment unit 120 determines that the terminal device 100 is not the destination node from the received first RREQ, the calculation unit 130 recalculates the first accumulative hop count by increasing the first accumulative hop count included in the first RREQ by one.

The control unit 140 determines and updates the route to the source node, based on the result of the determination performed by the judgment unit 120.

Specifically, if the judgment unit 120 determines that the first accumulative hop count included in the first RREQ does not exceed the predetermined route decision value, the control unit 140 determines the route by controlling the transmitting/receiving unit 110 to transmit the RREP to the node that has transmitted the first RREQ. At this time, if the judgment unit 120 determines that the first accumulative hop count exceeds the route decision value, the control unit 140 discards the first RREQ.

If the judgment unit 120 determines that the second accumulative hop count does not exceed the predetermined route decision value and the second accumulative power is below the first accumulative power, the control unit 140 determines the route by controlling the transmitting/receiving unit 110 to transmit the RREP to the node that has transmitted the second RREQ. That is, the control unit 140 updates the route to the source node using the second RREQ. Here, the first accumulative power is included in the first RREQ used when the routing to the source node is performed, and the second accumulative power is included in the second RREQ received after the routing is performed.

If the judgment unit 120 determines that the second accumulative power is equal to the first accumulative power and the second accumulative hop count is below the first accumulative hop count, the control unit 140 determines the route by controlling the transmitting/receiving unit 110 to transmit the RREP to the node that has transmitted the second RREQ. At this time, if the judgment unit judges that the second accumulative power is equal to the first accumulative power but the second accumulative hop count is not below the first accumulative hop count, the control unit 140 discards the received second RREQ.

Also, if the judgment unit 120 judges that the second accumulative power exceeds the first accumulative power, the control unit 140 discards the received second RREQ. That is, the control unit maintains the route determined by the first RREQ as it is. Here, the second RREQ is a packet for which the destination node is the terminal device 100.

If the judgment unit 120 determines that the terminal device 100 is not the destination node for the received first RREQ, the control unit 140 adds transmission power information, which may include the transmission power measured by the transmitting/receiving unit 110, the first accumulative power and the first accumulative hop count calculated by the calculation unit 130, to the first RREQ, and the control unit 140 controls the transmitting/receiving unit 110 to broadcast the first RREQ having the transmission power information added thereto. In this case, the control unit 140 also adds the address of the terminal device 100 to the first RREQ.

In an exemplary embodiment of the present invention, for convenience in explanation, the terminal device is exemplified as the destination node for the second RREQ received by the transmitting/receiving unit 110, which is received as a packet. However, the terminal device may be a relay node that is not the destination node for the second RREQ. In this case, the control unit 140 adds the transmission power information to the second RREQ in the same manner as the first RREQ, and the control unit 140 controls the transmitting/receiving unit 110 to broadcast the second RREQ having the transmission power information added thereto.

In an exemplary embodiment of the present invention, in the case of determining the route from the destination node to the source node using a predetermined waiting time, the transmitting/receiving unit 110 can receive the RREQ during the predetermined waiting time.

In this case, the judgment unit 120 compares accumulative hop counts of a plurality of RREQs received with the predetermined route decision value, and selects the RREQ having the minimum accumulative power among the plurality of RREQs having the accumulative hop counts that do not exceed the route decision value. Then, the control unit 140 determines the route to the source node by controlling the transmitting/receiving unit 110 to transmit the RREP to the node that has transmitted the RREQ selected by the judgment unit 120.

Figure 3:
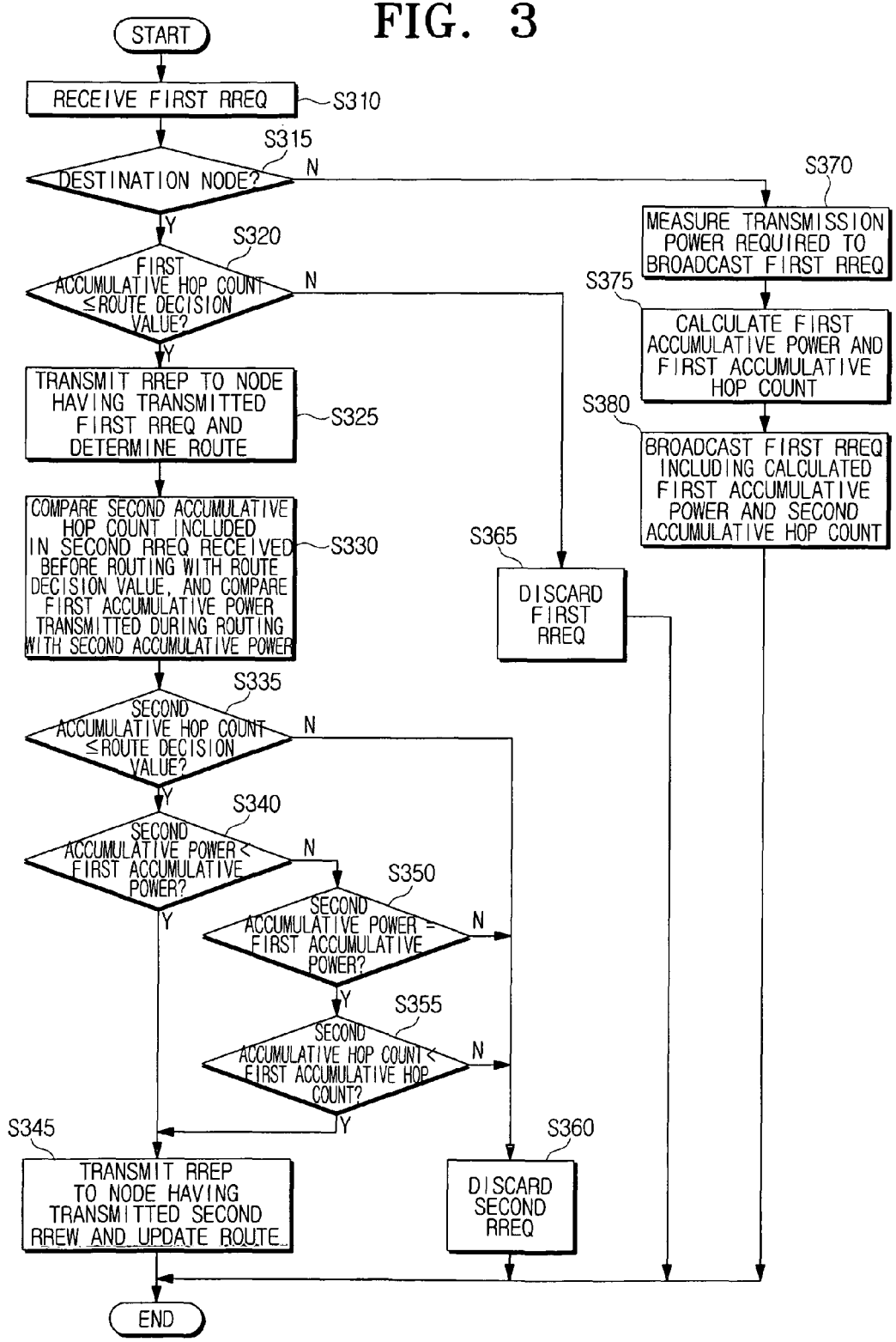
FIG. 3 is a flowchart illustrating a routing method according to an exemplary embodiment of the present invention.

FIG. 3 is a flowchart illustrating a routing method according to an exemplary embodiment of the present invention.

Referring to FIG. 3, if the terminal device 100 receives the first RREQ (S310), the judgment unit 120 determines whether the terminal device 100 is the destination node for the received first RREQ (S315).

If the terminal device is determined to be the destination node for the first RREQ, the judgment unit 120 determines whether the first accumulative hop count included in the first RREQ does not exceed the predetermined route decision value (S320). If the first accumulative hop count is determined to exceed the route decision value ("N" in S320), the control unit 140 discards the first RREQ (S365).

Here, the route decision value is a value that corresponds to the limited hop count from the source node to the destination node, and is predetermined in consideration of the transmission power and the route length from the source node to the destination node. That is, the route decision value is an optimal hop count that minimizes the packet delay with the transmission power reduced.

If the judgment unit 120 determines that the first accumulative hop count does not exceed the route decision value, the control unit 140 determines the route by controlling the transmitting/receiving unit 110 to transmit the RREP to the node that has transmitted the first RREQ (S325).

Then, if the transmitting/receiving unit 110 receives the second RREQ after the route to the source node is determined, the judgment unit 120 compares the second accumulative hop count included in the second RREQ with the predetermined route decision value, and compares the second accumulative power with the first accumulative power used for the routing (S330).

Specifically, the judgment unit 120 determines whether the second accumulative hop count does not exceed the route decision value (S335). Here, the accumulative hop count is the hop count accumulated until the RREQ is received in the destination node after the RREQ is broadcast from the source node. That is, the first accumulative hop count is the hop count accumulated until the first RREQ is received in the terminal device 100, and the second accumulative hop count is the hop count accumulated until the second RREQ is received in the terminal device 100.

Then, if the second accumulative hop count is determined not to exceed the route decision value, the judgment unit 120 judges whether the second accumulative power is below the first accumulative power (S340).

If the second accumulative power is determined to be below the first accumulative power, the control unit 140 determines the route by controlling the transmitting/receiving unit 110 to transmit the RREP to the node that has transmitted the second RREQ including the second accumulative power (S345).

That is, the control unit updates the route to the source node by replacing the route determined by the first RREQ by the route determined by the second RREQ.

At this time, if the second accumulative hop count is determined to exceed the route decision value ("N" in S335), the control unit 140 discards the second RREQ received after the routing (S360).

Meanwhile, if the second accumulative power is determined to exceed the first accumulative power ("N" in S340 and "N" in S350), the control unit 140 discards the received second RREQ (S360).

If the second accumulative power is determined to be equal to the first accumulative power ("N" in S340 and "Y" in S350), the judgment unit 120 determines whether the second accumulative hop count is below the first accumulative hop count (S355).

In this case, if the second accumulative hop count is determined to be below the first accumulative hop count ("Y" in S355), the control unit 140 re-determines the route by controlling the transmitting/receiving unit 110 to transmit the RREP to the node that has transmitted the second RREQ (S345). Meanwhile, if the second accumulative hop count is determined not to be below the first accumulative hop count ("N" in S355), the control unit 140 discards the received second RREQ (S360).

On the other hand, if the terminal device 100 is determined not to be the destination node for the first RREQ ("N" in S315), the transmitting/receiving unit 110 measures the transmission power required to broadcast the first RREQ having the specified information added thereto (S370).

Then, the calculation unit 130 recalculates the first accumulative power by adding the measured transmission power to the first accumulative power included in the received first RREQ, and recalculates the first accumulative hop count by increasing the first accumulative hop count included in the first RREQ by one (S375).

That is, if the terminal device 100 is the relay node, the calculation unit 130 recalculates the first accumulative power by adding the first accumulative power included in the first RREQ in the transmission power measured by the transmitting/receiving unit 110.

Then, the control unit 140 adds the transmission power information, which includes the first accumulative power calculated by the calculation unit 130, the first accumulative hop count, and the measured transmission power, to the first RREQ, and the transmitting/receiving unit 110 broadcasts the first RREQ having the transmission power information added thereto (S380).

On the other hand, in operation S325, the relay node having received the RREP transmits the RREP to the node having the minimum accumulative power among the nodes having the accumulative hop counts that do not exceed the predetermined route decision value by using the accumulative hop counts and accumulative powers stored in its own routing table, and repeats the same process as far as the relay node before the source node, so as to determine the route from the destination node to the source node.

In an exemplary embodiment of the present invention, the terminal device 100 is exemplified as a destination node of the second RREQ received in operation S330 as a packet. However, in the case where the terminal device 100 is a relay node that is not the destination node for the second RREQ, it can perform the operations S370 to S380.

Till now, the routing method from the destination node to the source node by transmitting all the RREPs for the received RREQs when the terminal device 100 is the destination node has been explained. Hereinafter, a routing method according to another exemplary embodiment of the present invention will be explained with reference to FIG. 4.

Figure 4:
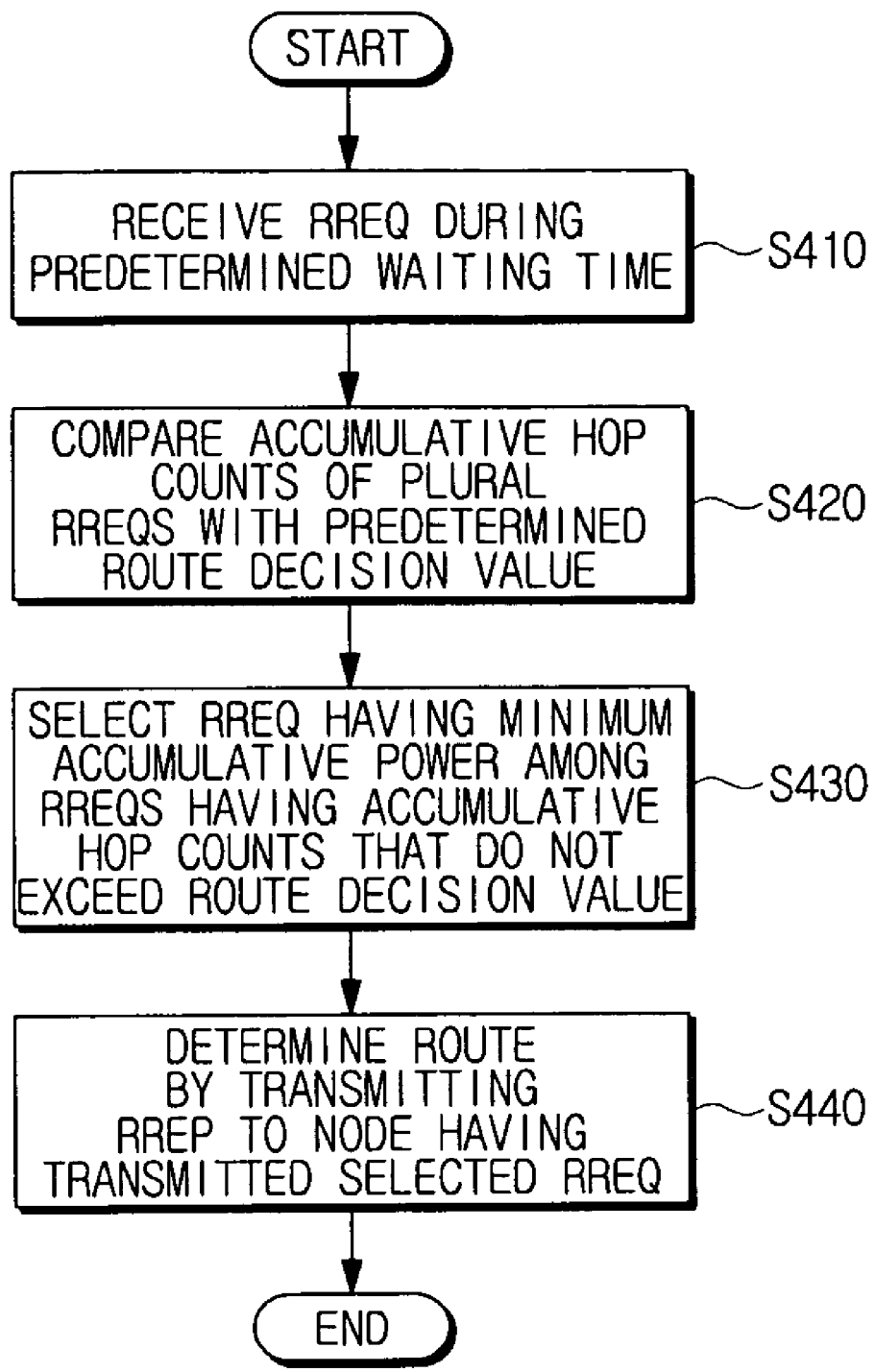
FIG. 4 is a flowchart illustrating a routing method according to another exemplary embodiment of the present invention.

FIG. 4 is a flowchart illustrating a routing method according to another exemplary embodiment of the present invention.

First, the transmitting/receiving unit 110 receives the RREQs during the predetermined waiting time (S410).

Then, the judgment unit 120 compares the accumulative hop counts of the RREQs received during the waiting time with the predetermined route decision value (S420).

Then, the judgment unit 120 selects the RREQ having the minimum accumulative power among the RREQs having the accumulative hop counts that do not exceed the route decision value (S430).

Specifically, the method of selecting the RREQ having the minimum power will be explained with reference to Table 1.

TABLE 1

|  | Accumulated Hop Count | Accumulated Power |
| --- | --- | --- |
| First RREQ | 5 | 20 |
| Second RREQ | 3 | 20 |
| Third RREQ | 5 | 15 |
| Fourth RREQ | 6 | 15 |

Referring to Table 1, the transmitting/receiving unit receives four RREQs for which the destination node is the terminal device 100 during the waiting time. For example, in the case where the route decision value is predetermined as "5", the judgment unit 120 compares the accumulative hop counts included in the first to fourth RREQs received during the waiting time with the predetermined route decision value in operation S420. Then, the judgment unit 120 selects the RREQ having the minimum accumulative power among the first to third RREQs having the accumulative hop counts that do not exceed the route decision value in operation S430. That is, the judgment unit 120 selects the third RREQ having the minimum accumulative power among the first to third RREQs.

Thereafter, the control unit 140 determines the route to the source node by controlling the transmitting/receiving unit 110 to transmit the RREP to the node that has transmitted the RREQ selected by the judgment unit 120 (S440). In this case, the control unit 140 discards all the packets except for the RREQ selected in operation S430 among the RREQs received during the waiting time in operation S410.

In another exemplary embodiment of the present invention, the routing method to the source node when the terminal device 100 is the destination node has been explained. However, the judgment unit 120 may also determine whether the terminal device 100 is the destination node for the RREQ received in operation S410, and if the terminal device 100 is not the destination node, operations S360 to S370 may be performed when the terminal device 100 is the relay node as explained with reference to FIG. 3.

Also, in another exemplary embodiment of the present invention, the routing method to the source node using a plurality of RREQs received during the first waiting time has been explained for convenience in explanation. However, by performing operations S330 to S360, the route to the source node may also be updated using the plurality of RREQs received during a second waiting time after the waiting time. Here, the first waiting time and the second waiting time may be equally determined, or may be differently determined.

As described above, according to the present invention, proper power consumption can be effected with the packet delay reduced by determining the route to the source node using the route decision value for limiting the hop count from the source node to the destination node.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A terminal device comprising:
   a judgment unit that determines whether a first accumulative hop count included in a first route request (RREQ) packet exceeds a predetermined route decision value for limiting a hop count from a source node to a destination node; and
   a control unit that determines a route to the source node based on information included in the first RREQ packet if the judgment unit determines that the first accumulative hop count does not exceed the route decision value,
   wherein the judgment unit compares a second accumulative hop count included in a second RREQ packet that is received after the route is determined with the predetermined route decision value, and compares a second accumulative power included in the second RREQ packet with a first accumulative power included in the first RREQ packet, which is used to determine the route; and
   wherein the control unit updates the route based on a result of comparing the second accumulative hop count with the predetermined route value and the second accumulative power with the first accumulative power.

2. The terminal device of claim 1, wherein the first RREQ packet comprises transmission power information including at least one of a transmission power required to transmit the RREQ packet, the first accumulative hop count, and the first accumulative power.

3. The terminal device of claim 1, wherein the predetermined route decision value is based on a transmission power required to transmit the first RREQ packet and a route length from the source node to the destination node.

4. The terminal device of claim 1, wherein the predetermined route decision value is an optimal hop count that reduces a transmission power required to transmit the first RREQ packet and reduces a packet delay.

5. The terminal device of claim 1, wherein the control unit determines the route to the source node by controlling a route reply (RREP) packet to be transmitted to a node which has transmitted the first RREQ packet that includes the first accumulative hop count if the judgment unit determines that the first accumulative hop count does not exceed the predetermined route decision value.

6. The terminal device of claim 1, wherein the control unit discards the first RREQ packet that is received if the judgment unit determines that the first accumulative hop count exceeds the predetermined route decision value.

7. The terminal device of claim 1, wherein the judgment unit determines whether the second accumulative hop count exceeds the predetermined route decision value, and the judgment unit determines whether the second accumulative power is less than the first accumulative power if the judgment unit determines that the second accumulative hop count does not exceed the predetermined route decision value; and
   wherein the control unit updates the route by controlling a route reply (RREP) packet to be transmitted to a node which has transmitted the second RREQ packet that includes the second accumulative power if the judgment unit determines that the second accumulative power is less than the first accumulative power.

8. The terminal device of claim 7, wherein the judgment unit determines whether the second accumulative hop count is less than the first accumulative hop count if the judgment unit determines that the second accumulative power is equal to the first accumulative power; and
   wherein the control unit updates the route by controlling the RREP packet to be transmitted to the node which has transmitted the second RREQ packet if the judgment unit determines that the second accumulative power is equal to the first accumulative power and the second accumulative hop count is less than the first accumulative hop count.

9. The terminal device of claim 8, wherein the control unit discards the second RREQ packet if the judgment unit determines that the second accumulative hop count exceeds the predetermined route decision value, the second accumulative power exceeds the first accumulative power, or the second accumulative power is equal to the first accumulative power and the second accumulative hop count is not less than the first accumulative hop count.

10. The terminal device of claim 1, further comprising:
   a transmitting and receiving unit that transmits and receives the first RREQ packet, transmits a route reply (RREP) packet, which is a reply packet to the first RREQ packet, and measures a transmission power required to broadcast the first RREQ packet; and
   a calculation unit that recalculates the first accumulative hop count by increasing the first accumulative hop count that is included in the first RREQ packet received through the transmitting and receiving unit by one, and recalculates the first accumulative power by adding the transmission power, which is measured by the transmitting and receiving unit, to the first accumulative power included in the first RREQ packet;

wherein the control unit adds transmission power information, which includes the first accumulative power calculated by the calculation unit, the first accumulative hop count, and the transmission power measured by the transmitting and receiving unit, to the first RREQ packet, and controls the transmitting and receiving unit to broadcast the first RREQ packet that includes the transmission power information added thereto.

11. The terminal device of claim 10, wherein the judgment unit determines whether the terminal device is the destination node for the first RREQ packet;

the transmitting and receiving unit measures a transmission power required to broadcast the first RREQ packet if the judgment unit determines that the terminal device is not the destination node; and the calculation unit recalculates the first accumulative power and the first accumulative hop count if the judgment unit determines that the terminal device is not the destination node.

12. The terminal device of claim 1, further comprising a transmitting and receiving unit that transmits and receives a plurality of RREQ packets during a predetermined waiting time and transmits route reply (RREP) packets in response to the plurality of RREQ packets;

wherein the judgment unit compares accumulative hops included in each of the plurality of RREQ packets with the predetermined route decision value, and selects an RREQ packet among the plurality of RREQ packets to be used for routing based on a result of comparing the accumulative hops included in the each of the plurality of RREQ packets with the predetermined route decision value; and wherein the control unit determines the route by controlling the RREP packet to be transmitted to a node that has transmitted the RREQ packet that is selected.

13. The terminal device of claim 12, wherein the judgment unit selects RREQ packets having accumulative hop counts that are less than the route decision value among the plurality of RREQ packets, and selects an RREQ packet that has a minimum accumulative power among the RREQ packets that are selected as the RREQ packet to be used for the routing.

14. A routing method comprising:

determining, by a terminal device, whether a first accumulative hop count included in a first route request (RREQ) packet exceeds a predetermined route decision value for limiting a hop count from a source node to a destination node; and determining a route to the source node based on information included in the first RREQ packet if the first accumulative hop count is determined not to exceed the route decision value, wherein the determining whether the first accumulative hop count exceeds the predetermined route decision value comprises comparing a second accumulative hop count included in a second RREQ packet that is received after the route is determined with the predetermined route decision value, and comparing a second accumulative power included in the second RREQ packet with a first accumulative power included in the first RREQ packet, which is used to determine the route; and wherein the route is updated based on a result of comparing the second accumulative hop count with the predetermined route value and the second accumulative power with the first accumulative power.

15. The routing method of claim 14, wherein the first RREQ packet comprises transmission power information including at least one of a transmission power required to transmit the RREQ packet, the first accumulative hop count, and the first accumulative power.

16. The routing method of claim 14, wherein the predetermined route decision value is based on a transmission power required to transmit the first RREQ packet and a route length from the source node to the destination node.

17. The routing method of claim 14, wherein the predetermined route decision value is an optimal hop count that reduces a transmission power required to transmit the first RREQ packet and reduce a packet delay.

18. The routing method of claim 14, wherein the determining the route to the source node comprises determining the route by controlling a route reply (RREP) packet to be transmitted to a node which has transmitted the first RREQ packet that includes the first accumulative hop count if the first accumulative hop count is determined not to exceed the predetermined route decision value.

19. The routing method of claim 14, wherein the first RREQ packet that is received is discarded if the first accumulative hop count is determined to exceed the predetermined route decision value.

20. The routing method of claim 14, wherein the determining whether the first accumulative hop count exceeds the predetermined route decision value further comprises determining whether the second accumulative hop count exceeds the predetermined route decision value, and determining whether the second accumulative power is less than the first accumulative power if the judgment unit determines that the second accumulative hop count does not exceed the predetermined route decision value; and wherein the route is updated by controlling a route reply (RREP) packet to be transmitted to a node which has transmitted the second RREQ packet that includes the second accumulative power if the second accumulative power is determined to be less than the first accumulative power.

21. The routing method of claim 20, wherein the second accumulative hop count is determined to be less than the first accumulative hop count if the second accumulative power is determined to be equal to the first accumulative power; and wherein the route is updated by controlling the RREP packet to be transmitted to the node which has transmitted the second RREQ packet if the second accumulative power is determined to be equal to the first accumulative power and the second accumulative hop count is less than the first accumulative hop count.

22. The routing method of claim 20, wherein the second RREQ packet is discarded if the second accumulative hop count is determined to exceed the predetermined route decision value, the second accumulative power is determined to exceed the first accumulative power, or the second accumulative power is determined to be equal to the first accumulative power and the second accumulative hop count is not less than the first accumulative hop count.

23. The routing method of claim 14, further comprising:

transmitting and receiving the first RREQ packet, transmitting a route reply (RREP) packet, which is a reply packet to the first RREQ packet, and measuring a transmission power required to broadcast the first RREQ packet; and recalculating the first accumulative hop count by increasing the first accumulative hop count that is included in the first RREQ packet by one, and recalculating the first accumulative power by adding the transmission power that is measured to the first accumulative power included in the first RREQ packet;

wherein transmission power information is added, including the first accumulative power that is calculated, the first accumulative hop count, and the transmission power that is measured, to the first RREQ packet, and the first RREQ packet is broadcast having the transmission power information added thereto.

24. The routing method of claim 23, wherein the determining whether the first accumulative hop count exceeds the predetermined route decision value further comprises determining whether the terminal device is the destination node for the first RREQ packet;

wherein a transmission power required to broadcast the first RREQ packet is measured if the terminal device is determined not to be the destination node; and the first accumulative power and the first accumulative hop count are recalculated if the terminal device is determined not to be the destination node.

25. The routing method of claim 14, further comprising:

transmitting and receiving a plurality of RREQ packets during a predetermined waiting time and transmitting route reply (RREP) packets in response to the plurality of RREQ packets;

wherein accumulative hops included in each of the plurality of RREQ packets are compared with the predetermined route decision value, and an RREQ packet among the plurality of RREQ packets is selected to be used for routing based on a result of comparing the accumulative hops included in each of the plurality of RREQ packets with the predetermined route decision value; and wherein the accumulative hops included in each of the plurality of RREQ packets are compared with the predetermined route decision value, and an RREQ packet among the plurality of RREQ packets is selected to be used for routing based on a result of comparing the accumulative hops included in each of the plurality of RREQ packets with the predetermined route decision value.

26. The routing method of claim 25, wherein the RREQ packets having accumulative hop counts that are less than the route decision value are selected among the plurality of RREQ packets, and an RREQ packet that has a minimum accumulative power among the RREQ packets is selected as the RREQ packet to be used for the routing.

\* \* \* \* \*